United States Patent Office 3,420,910
Patented Jan. 7, 1969

3,420,910
COPPER SWEETENING PRETREATING BEFORE ISOMERIZING ALPHA-PINENE
Carl Bordenca, Ponte Vedra Beach, John Mentzer Derfer, Jacksonville, and Clayton B. Hamby, Atlantic Beach, Fla., assignors, by mesne assignments, to S.C.M. Corporation, New York, N.Y., a corporation of New York
No Drawing. Continuation-in-part of application Ser. No. 479,275, Aug. 12, 1965. This application Jan. 16, 1967, Ser. No. 609,361
The portion of the term of the patent subsequent to Dec. 19, 1984, has been disclaimed
U.S. Cl. 260—675.5          8 Claims
Int. Cl. C07c 7/02; C07c 7/16; C07c 5/22

ABSTRACT OF THE DISCLOSURE

A process for removing catalyst poisoners from α-pinene stock by contacting it at a sweetening-reactive temperature between about 50° C. and about 300° C. with copper or copper oxide, and then isomerizing the pretreated stock with a hydrogen-acceptor catalyst under neutral to basic conditions at a temperature between about room temperature and about 300° C. Passing a non-reactive gas through the sour α-pinene supply, preferably simultaneously with such treatment by copper or copper oxide, provides improved results by removing from a α-pinene lower boiling, sour-inducing impurities, thereby increasing the efficiency of the sweetening step and prolonging the useful life of the copper or copper oxide as a sweetening agent.

Cross references to related applications

This application is a continuation-in-part of a copending application, "Isomerization of Alpha-Pinene," filed Aug. 12, 1965 and assigned Ser. No. 479,275, which issued on June 13, 1967, as Patent No. 3,325,553, the latter being a continuation-in-part application of a prior application, "Alpha-Pinene Isomerization and Product," filed Feb. 19, 1964 which issued on Oct. 11, 1966 as Patent No. 3,278,623.

Background of the invention

Naturally-occurring β-pinene has been isolated from certain α-pinene-rich turpentines, for example, gum and sulfate turpentine from U.S. sources. Beta-pinene is useful as a raw material for producing terpene resins, myrcene and nopol, (6,6-dimethyl bicyclo(3,1,1) - 2 - heptene-2 ethanol) regardless of its optical configuration, and is particularly valuable as a raw material in the synthesis of fine chemicals such as l-menthol and d-citronellol when such pinene has high optical activity (laevo rotation).

Alpha-pinene is much more abundant than β-pinene, but the alpha isomer has been less valuable as a starting material for chemical syntheses. Alpha-pinene is available from virtually all world turpentine supplies, typically gum, wood and sulfate turpentine in the United States and from many foreign turpentines. Accordingly, there has been interest in converting α-pinene to β-pinene for a number of years, but the prospects for economic, commercial operation heretofore have been slight.

Prior attempts to obtain β-pinene have not been of commercial value because of the high proportions of undesirable by-products which hinder significantly a ready separation of α-pinene from β-pinene and a resulting economic recovery of β-pinene in high purity. The invention described and claimed in the Derfer U.S. Patent 3,278,623 for the first time makes possible the economic recovery of β-pinene from a substantially non-destructive catalytic isomerization of a α-pinene. Broadly, the process of this patent comprises establishing vapor or liquid phase contact between an α-pinene supply and a transitory hydrogen-acceptor catalyst under neutral to basic conditions in a reaction zone maintained at a temperature within a range of about room temperature to about 300° C., and withdrawing from the reaction zone a novel isomerizate enriched in β-pinene.

While the process of the cited Derfer patent is, as indicated, the first successful, economic, commercial source of β-pinene by catalytic isomerization, it has been noted that the α-pinene supply tends to poison many catalysts employed, especially a preferred noble metal catalyst, palladium, and is deleterious to catalyst activity. The poisoning of the catalysts is due to the presence of several contaminants in the supply. While the principal offender appears to be chemically combined sulfur, still other ingredients poison the catalysts, such as certain organic chlorides, for examples, those introduced by hypochlorite treatment of pinene, although other chloride such as bornyl chloride and geranyl chloride have not been particularly harmful. As used here and in the claims, "pretreating" the α-pinene supply is intended to include the inhibition of one or all of such offending ingredients in the α-pinene supply from having such undesirable poisoning effect on an isomerization catalyst.

Summary

It has been discovered that copper in the form of elemental metallic copper or a copper oxide or mixtures thereof is an effective sweetener of sour α-pinene stock; and that this pretreatment does not interfere with subsequent equilibration of the treated α-pinene over a hydrogen-acceptor catalyst so as to form β-pinene. The α-pinene may be either in a liquid or vapor phase. Improved results are obtained if the α-pinene stock is also purged or stripped by a non-reactive gas. Preferably, such an inert gas, for instance, nitrogen, carbon dioxide, carbon monoxide, helium, neon, argon, or the like, is passed through the α-pinene supply while it is simultaneously undergoing treatment with the copper sweetening agent.

Copper has been suggested in the past to treat hydrocarbon stocks and petroleum distillates. However, such materials have much greater stability toward chemical reagents than the highly reactive turpentine compounds such as pinene. It would not be obvious that metallic copper or copper oxide would have the ability to sweeten unsaturated, sour α-pinene without engendering, for example, unwanted side reactions. Further, sulfur bodies present in petroleum distillates differ greatly in chemical nature from those which may contaminate turpentine.

In addition to the foregoing, it is emphasized that in many instances, for reasons not fully understood, following pretreatment with some sweetening agents α-pinene does not equilibrate, or does so only in ineffectual amounts of β-pinene, over an isomerization agent of the type disclosed and claimed in Derfer Patent No. 3,278,623. Accordingly, it is significant to discover a sweetening agent which not only performs that function on sour α-pinene, but in addition does not by that action inhibit satisfactory catalytic isomerization of the α-pinene to β-pinene.

The action of the non-reactive gas has been found to remove the lower boiling, sour-inducing impurities, such as dimethyl sulfide, from the α-pinene stock by entraining such impurities in the gas and sweeping them away. This results in several advantages. The efficiency of the sweetening action is increased; the necessary contact time is reduced; and the useful life of the copper or copper oxide as a sweetening agent is prolonged since it is subjected to less severe "sweetening" requirements. All of these advantages are accumulatively important to a continuous process, wherein it is highly advantageous to avoid "shutdown" periods for equipment designed for isomerization or other catalytic activity. Such periods can become quite costly due to the loss of production time. By virtue of the enumerated advantages, the conjoint use of a copper sweetener and a purging non-reactive gas permits a continuous process to remain on-stream for a longer period with less frequent interruptions for replacing spent sweetening agent or isomerization catalyst or both. The arrangement of a sweetening agent in one zone or bed and the isomerization catalyst in another zone or bed further provides a much more flexible operation and structurally permits a smaller isomerization case in which to house the catalyst.

Description of the preferred embodiments

The prime α-pinene supply which may be used is a pure or virtually pure α-pinene. However, the usual commercial grade of α-pinene distillate contains a percent or two of camphene as an indigenous impurity; such grade is economical and quite suitable for our purposes. Additionally, because β-pinene customarily is recovered by fractional distillation of sulfate or gum turpentine, one could use turpentine directly as the α-pinene supply, for example, by feeding it into a distillation unit and obtaining primarily α-pinene as an overhead distillate as the pinene supply for the isomerization reaction, while accumulating a bottoms product of β-pinene, dipentene, oxygenated materials and sesquiterpenes, e.g., anethole, caryophyllene, and methyl chavicol. The bottoms product could then be fractionated to recover β-pinene and the other high-boiling components. The pinene supply is, for all practical purposes, anhydrous.

As indicated, if many α-pinene supplies are used in an untreated form for the isomerization step, the catalyst life is quite short. In general, an α-pinene supply is considered to require pretreatment if, when contacted by one percent of catalyst of 0.5 percent palladium on alumina for 0.5 hour at atmospheric reflux temperature, there is an increase of β-pinene in the supply of less than 4.5 percent.

The efficiency of the isomerization operation could, therefore, be substantially increased if catalyst poisoning were appreciably reduced or eliminated. Normally, the chief catalyst poisoner found in the α-pinene is sulfur which can be present in several chemically combined forms. However, still other compounds may be present in the α-pinene supply which poison the catalyst, such as the certain organic chlorides previously noted.

Referring to the pretreatment technique of the present invention in greater detail, elemental metallic copper or copper oxide may be used as the sweetening agent. While cuprous oxide is operable, due to the generally oxidation conditions of the sweetening step, the oxide present is usually cupric oxide. For convenience of reference, "copper" as used herein, can also be taken to include a "copper oxide."

The copper preferably has an extended surface area to facilitate contact with the α-pinene. For example, so-called mossy copper can be used. In general, copper chips or granules should be of a size to pass 80 mesh, U.S. Standard sieve, but need be no finer than 120 mesh, U.S. Standard sieve. Cut squares of copper screen (100 mesh) measuring ¼ inch on the side have also been used.

The sour α-pinene may be pretreated either in the liquid or vapor phase. As a liquid feed, the α-pinene is merely mixed with the copper in a batch operation, or passed through a bed of the copper sweetener in a continuous operation. The temperature of the pretreatment may range from about 50° C. to about 300° C., although at the higher temperatures, for example 155° C. and higher, superatmospheric pressures are needed to maintain the liquid phase. At temperatures upwards of about 225° C. a α-pinene tends to decompose. However, with respect to both liquid and vapor phase pretreatments, sweetening (as well as isomerization) may be carried out up to about 300° C. with quite short contact times and preferably with a fresh, highly active sweetening agent. In the case of a vapor phase pretreatment, subatmospheric pressures also facilitate the use of the higher temperatures.

As a vapor feed, the α-pinene is passed through a bed or column containing the copper sweetening agent. This technique is especially useful when a continuous process is desired. The temperature of pretreatment for the vapor phase may range from about 150° C. to about 300° C.

The length of contact time for the pretreatment of either a liquid or vapor phase operation naturally depends on the amount of impurities present and the degree of impurities which can be tolerated in the charge for subsequent isomerization. However, in general the contact time for a liter of sour α-pinene may range from about 0.1 hour to about 24 hours.

When a non-reactive gas is employed as an adjunct to the copper pretreatment, the gas may be bubbled through a liquid α-pinene supply as a batch operation; or, the gas may be passed concurrently with a liquid or vaporized α-pinene charge through a bed or column of the copper. Again, the amount and extent of gas stripping depends on the amount of impurities present and/or the amount which may be acceptably retained. In general, a contact time that has been found to be satisfactory for a non-reactive gas is equivalent to passing about 6 cubic centimeters per minute to about 700 cubic centimeters per minute of the gas through a column of the α-pinene having a height of about 10 feet and a cross-sectional area of about one square inch. Any gas which is non-reactive under the conditions of pretreatment may be used. Nitrogen, carbon dioxide, carbon monoxide are normally used because of their availability and relatively low cost. However, such gases as helium, neon, and argon are also operative.

After the copper sweetener has become spent from extended use, it may be reactivated. While copper oxide may initially be used as a sweetening agent, it is preferred to start with fresh metallic copper which may become oxidized in the course of the regeneration action. To regenerate spent copper sweetener, air and hydrogen are alternately passed over the copper for about three to about 10 passes at a temperature from about 325° C. to about 425° C. The alternating oxidation and reduction produces clean, active, metallic copper. If desired, the copper may be activated in situ, that is, in the bed in which it is ultimately to be used; or the copper may be so treated apart from the sweetening apparatus.

After pretreatment is completed, the α-pinine may be subjected to isomerization as described in the Derfer Patent No. 3,278,623. For the substantially non-destructive isomerization of α-pinene to β-pinene it is essential to maintain the reaction mixture and catalyst (and a catalyst support if one is used) non-acidic in any sense of the word, either where considered as a conventional acid of a conventionally measurable acidity by titration or the like, a Lewis acid, or a material which reacts with a Hammett indicator to give an acid indication. Thus, pure alumina, for example, from aluminum hydroxide or aluminum isopropylate, is a suitable support; whereas silica gel, which reacts as acid to neutral red Hammett indicator, is deleterious as are clays, silica-alumina, and other well-known petroleum cracking catalysts. Thus, the reaction environment should be neutral to basic when measured with neutral red Hammett indicator. Acidic material inherent in or sorbed on the catalyst support is quite detrimental.

The parent Patent No. 3,278,623, describes and illustrates various systems for isomerizing the α-pinene. As there disclosed, the apparatus employed may vary from a sealed steel bomb for the α-pinene supply and catalyst to an atmospheric fractionational distillation process wherein a concentration of the higher boiling β-pinene (as compared to α-pinene) gradually accumulates in collection vessels. The isomerization process can be either continuous or discontinuous, and in either case at superatmospheric, atmospheric, or moderately subatmospheric pressures. The α-pinene supply can also be either in the liquid or vapor phase during isomerization.

As described in Derfer Patent No. 3,278,623, among the isomerization catalysts which may be employed are alkali metals and their $C_{3-6}$ alkoxides, sulfur, iodine, and a metal of Group VIII of the Periodic Table in the presence of hydrogen, such metal having an atomic number of 28 to 78, inclusive.

In room temperature operation with the catalysts of the present application, the equilibrium between α- and β-pinene that is approached in a practical operating period is about 3 percent β-pinene; at an operating temperature of about 150° C., it is about 4 percent; and at 220° C., it is about 5.5 to 7 percent β-pinene. For practical operating purposes, it is preferred to operate between about 150° C. and about 225° C. to obtain enhanced β-pinene concentration in the isomerizate. Above this temperature the formation of thermal isomerization and degradation products (by-products) appears to be accelerated when appreciable contact times are permitted, for example, a minute or more, between the catalyst and the pinene supply. Because substantial conversion of α- to β-pinene can be achieved even closely approaching equilibrium in mere tenths of a second with a very active catalyst such as elemental palladium, it is possible to operate at a temperature as high as about 300° C. and still obtain reasonably good results by using a restricted average contact time, for example, by using a vapor phase operation.

In a flow operation the average contact time is computed as the quotient in consistent units of the pinene capacity of the catalytic reaction zone divided by the volumetric input of pinene supply thereto per unit time corrected to average temperature and pressure conditions in the catalytic reaction zone. Successful isomerization procedures have been carried out using contact times as low as a few tenths of a second upwards to many hours. For vapor phase operation and maximum use of a given volume of catalyst, it is preferred to use contact times between about 0.1 and about one second, or longer. In liquid phase operations, a contact time is the desirability to avoid prolonged times (over 60 seconds) in operations at a temperature about above 225° C. for suppressing by-product formation.

A recommended recovery technique is that of fractional distillation at a maximum temperature not above 200° C. and preferably about 125° C. to suppress thermal formation of by-products in the distillation. Other conventional processes can be used in separating α- from β-pinene in the isomerizate as disclosed in the parent application, Patent No. 3,278,623.

The following examples are intended only to illustrate the invention and should not be construed in any way as limiting the disclosure. One skilled in the art of terpene chemical operations will recognize how important it is to suppress formation of related isomerization products such as menthadienes (limonene chiefly), camphene, cymene, and alloocimene because they boil relatively close to β-pinene and are comparatively difficult to separate therefrom efficiently.

The α-pinene supply used in all cases was recovered from sulfate turpentine, the technical grade containing 98 percent α-pinene and about two percent camphene as an indigenous impurity. Where a purer grade of α-pinene was used, containing less than about one percent extraneous materials, the pinene supply was considered "pure" for all practical purposes. In all cases quantitative analysis of the feed and output was done by vapor phase chromatography using as a base "Carbowax 20M," the trademark for an ethylene oxide condensation product having average molecular weight of about 20,000. All temperatures are given in degree centigrade, and all percentages are weight percentages unless otherwise expressly indicated.

EXAMPLE 1

A copper tube measuring 10 feet in height and ⅝ inch in diameter was packed with squares of a copper screen measuring ¼ inch on a side and passing 100 mesh, U.S.S. A molten salt bath surrounded the copper tube to maintain it at a constant temperature.

The copper in the tube was activated by alternatively passing air and hydrogen over it at 400° C. A sample of vaporized sour α-pinene containing 2930 p.p.m. sulfur was passed over the reduced copper at 200° C. for five different, consecutive passes. Samples from passes 1, 3, and 5 were analyzed for sulfur and showed, respectively, 1360, 1150 and 1100 parts per million (p.p.m.).

The treated α-pinene from the fifth pass partially equilibrated over palladium as an isomerization catalyst. In particular, the treated α-pinene was isomerized in a fractional distillation unit wherein one vessel which received the condensed distillate was charged with one percent of 0.5 percent palladium on alumina as a catalyst.

EXAMPLE 2

A series of passes of liquid, sour α-pinene, similar to those in Example 1, was again carried out with the exception that the sweetener comprised copper oxide. Again the first, third, and fifth pass were analyzed for sulfur and indicated, respectively, 1450, 785, and 790 p.p.m.

Thereafter, the treated α-pinene was isomerized by a continuous method wherein heated α-pinene was passed through a catalyst chamber containing Raney nickel, activated prior to use with gaseous hydrogen for about one hour at 100° C. The catalyst chamber was contained in a molten salt bath of controlled temperature.

EXAMPLE 3

The procedure of Example 1 was repeated, except that in addition nitrogen gas was passed concurrently through the tube together with the α-pinene, the gas flowing at a rate of about 10 cubic centimeters per minute. A sample of the α-pinene following the fifth pass through the column contained only 25 p.p.m. of sulfur. The treated α-pinene equilibrated on a palladium isomerization catalyst.

EXAMPLE 4

A glass column, packed with reduced copper "squares" passing 100 mesh, U.S.S., was equipped at one end with a fractionation head and connected at the opposite end to a flask containing about two liters of sour α-pinene. Nitrogen gas was slowly bled into the flask at the rate of about 15 cubic centimeters per minute, and the α-pinene was brought to reflux, the column temperature being held at about 200° C. by external heating. The treated α-pinene was removed overhead at the rate of about one cubic centimeter per minute. An analysis of the overhead indicated only 55 p.p.m. of sulfur. A sample of this product isomerized and equilibrated normally over a platinum isomerization catalyst to produce β-pinene.

As indicated, it is not always possible to predict beforehand whether a given agent will not only sweeten sour α-pinene but also avoid interfering with a satisfactory subsequent isomerization of the treated α-pinene over a catalyst of the Derfer Patent No. 3,278,623. For example, pretreatment of sour α-pinene with ammonia, treatment over clay, and stirring at ambient temperatures with potassium dichromate-sulfuric acid solution have all been tried and resulted in organoleptically unsatisfactory α-pinene. Also, even though most of the dimethyl sulfide can be removed from sour α-pinene by repeated water washing, the product often still retains an offensive odor and will not equilibrate over an isomerization catalyst of the cited Derfer patent.

While the foregoing describes several embodiments of the present invention, it is understood that the invention

What is claimed is:

1. A process for pretreating and isomerizing a sour α-pinene supply to produce sweetened β-pinene, comprising:

pretreating the sour α-pinene supply in a first zone at a sweetening-reactive temperature between about 50° C. and about 300° C. by contacting it with a copper sweetening agent selected from the group consisting of copper, copper oxide, and mixtures thereof, and then contacting the pretreated α-pinene supply in a second zone with a hydrogen-acceptor catalyst under neutral to basic conditions and at a temperature between about room temperature and about 300° C., said hydrogen-acceptor catalyst being free of acidic support, to effect isomerization of α-pinene to β-pinene.

2. The process of claim 1 wherein said pretreatment step further includes passing a non-reactive gas through the sour α-pinene supply as an aid in removing therefrom the sour-inducing impurities.

3. The process of claim 1 wherein a non-reactive gas is passed through the sour α-pinene supply simultaneously with said pretreating step with the copper sweetening agent to strip away the lower boiling, sour-inducing impurities, thereby to increase the efficiency of the sweetening step and prolong the useful life of the copper sweetening agent.

4. The process of claim 2 wherein said non-reactive gas is selected from the group consisting of nitrogen, carbon dioxide, carbon monoxide, neon, and argon.

5. The process of claim 2 wherein the contact time between the sour α-pinene and the non-reactive gas is equivalent to passing about 6 cubic centimeters per minute to about 700 cubic centimeters per minute through a column of the α-pinene having a height of about 10 feet and a cross-sectional area of about one square inch.

6. The process of claim 1 wherein said sour α-pinene supply is pretreated in a liquid phase at a temperature from about 50° C. to about 300° C.

7. The process of claim 1 wherein said sour α-pinene supply is pretreated in a vapor phase at a temperature from about 150° C. to about 300° C.

8. A two-stage process for the substantially non-destructive isomerization of α-pinene to β-pinene in a volume of sour α-pinene supply habing an initial concentration $C_1$ of β-pinene, $C_1$ being from zero to about 5 percent by weight, said process comprising:

pretreating said sour pinene supply in a liquid phase as the first stage with a copper sweetening agent selected from the group consisting of elemental copper and copper oxide at a temperature between about 50° C. and about 300° C., simultaneously with said pretreatment passing a non-reactive gas through the sour α-pinene supply to aid in the sweetening, and then vaporizing the treated pinene supply and contacting it with a transitory hydrogen-acceptor catalyst as the second stage under neutral to basic conditions in a reactive zone maintained between about 150° C. and about 300° C., and withdrawing from said reaction zone an isomerizate having concentration $C_2$ of β-pinene, $C_2$ being greater than $C_1$.

References Cited
UNITED STATES PATENTS

| | | | |
|---|---|---|---|
| 564,923 | 7/1896 | Frasch | 208—246 |
| 572,676 | 12/1896 | Frasch | 208—246 |
| 1,604,235 | 10/1926 | Odom | 208—246 |
| 1,608,339 | 11/1926 | Ridge et al. | 208—246 |
| 1,760,585 | 5/1930 | Cross | 208—246 |
| 1,840,158 | 1/1932 | Cross | 208—246 |

DELBERT E. GANTZ, *Primary Examiner.*

G. E. SCHMITKONS, *Assistant Examiner.*

U.S. Cl. X.R.

208—246